May 28, 1968   GUIDO OPPI FORCESI   3,385,473
DEVICE FOR DELIVERING METERED AMOUNTS OF MOLTEN METAL, BY
MEANS OF A VARIABLE CAPACITY AIR- OR
OTHER GAS-CONTAINER
Filed Sept. 22, 1965
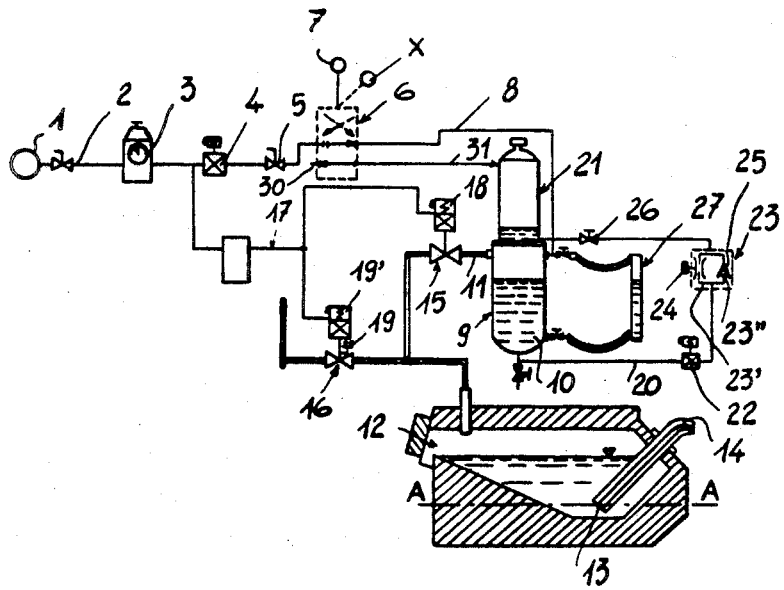
INVENTOR.
GUIDO OPPI FORCESI
BY Stenberg & Blake
Attys United States Patent Office 3,385,473
Patented May 28, 1968

3,385,473
DEVICE FOR DELIVERING METERED
AMOUNTS OF MOLTEN METAL, BY
MEANS OF A VARIABLE CAPACITY
AIR- OR OTHER GAS-CONTAINER
Guido Oppi Forcesi, Corso Matteotti 11,
Milan, Italy
Filed Sept. 22, 1965, Ser. No. 489,348
10 Claims. (Cl. 222—23)

ABSTRACT OF THE DISCLOSURE

A device for delivering a liquid product out of a delivery container means. The delivery container means delivers the liquid product in response to the action of a gas under pressure on the surface of the liquid product. An indicating container means contains an indicating liquid the level of which will indicate the level of the liquid product, and within the indicating container means over the indicating liquid therein there is a body of gas under pressure which urges the indicating liquid out of the indicating container means. A connecting conduit means communicates with both of the container means to place the body of gas under pressure in communication with the liquid product so that the one body of gas under pressure acts on both liquids. A discharge control means communicates with the indicating liquid to provide for the latter a controlled rate of discharge from the indicating container means which will situate the level of the indicating liquid at an elevation which accurately indicates the level of the liquid product. In this way it becomes possible to know the level of the liquid product without requiring any structure to engage the liquid product directly for indicating the level thereof, and thus it becomes possible to handle in a highly convenient manner liquid products such as molten metals, for example.

---

This invention relates to a device for delivering metered amounts of molten metal from a furnace or crucible to a casting station, as e.g. a die-casting machine.

Many types of devices, designed for the above stated purpose, are already known; however, none of them has proven to be up to requirements, owing either to its high cost, or to the intricacy of its design, or to many inherent sources of troubles, the presence of floats partly immersed in the molten metal, and that in the long run are subject to a wear, thereby prejudicing the precision of delivery, or to other shortcomings, a detailed enumeration of which would take a too long time, owing to the existence of a very great number of different devices, and since each device suffers of their own shortcomings.

An extraordinarily simple solution is provided by the invention for the problem of accurate metering of molten metal, and to such a purpose, the pressure air or gas, designed to propel the metered amount of molten metal out of the furnace or crucible, is previously delivered into a variable capacity bottle or container, which is designed in such a manner that an increase in its capacity occurs when the molten metal level in the furnace or crucible is reduced.

The invention will be better understood from a consideration of the following detailed description of a particular embodiment form thereof, as diagrammatically shown in the accompanying drawings, being both description and drawing given as a not restrictive example only.

In same drawing, 1 is a whatever, suitable source of compressed or pressure air, having a duct 2 that leads into a pressure reducer 3. The outlet of said pressure reduced is connected, through an electrovalve 4 and a cock 5, with a slide valve, or four-ways valve 6, that can be manually controlled by means of handlever 7, which tends to keep itself in the position as shown with solid lines. Said slide valve is connected by a duct 8 with a container, indicated in its entirety with 9, and that is partly filled with oil 10. Such container is in turn connected, by a duct 11, with the furnace 12, wherein the molten metal 13 is contained, being such molten metal designed to be delivered through the nozzle 14, which lower end is immersed in the bath. Two valves, respectively indicated by the numerals 15 and 16, are fitted in the duct 11. More precisely, the valve 16 is fitted in a branch of duct 11, and allows to put same branch in communication with the atmosphere. Said valves 15 and 16 are operated by the pneumatic circuit 17, by which same valves are respectively opened and closed, when the windings 18 and 19' are energized. In other words, it is matter of follow-up valves, that are operated by an electrically controlled pneumatic circuit. Moreover, the valve 16 cooperates with a microswitch 19, which is closed when the position of complete closing is attained by same valve.

As previously stated, the container 9 is partly filled with oil, and its bottom is connected by the pipe 20, with a second container 21, that is fitted above the former container. The duct 20 is equipped with an electrovalve 22, as well as with an assembly 23 consisting of two parallel-connected branches 23' and 23", the former of which is fitted with a throttle that can be adjusted by means of the knob 24, while a non-return valve 25 is fitted in the latter branch in order to allow an oil flow from container 21 to container 9 only. 26 is a cock fitted in the duct 20, while 27 is a level gauge, that is respectively connected, through cocks, with the upper, and lower ends of container 9, being thus the oil level in said container indicated by said gauge 27. The duct 8 serves for the connection with the container top.

The operation of the above described plant is as follows:

It is assumed that the highest level is attained by the molten metal contained in the furnace 12, and that the whole amount of oil is present in the container 9, while a given, metered amount of molten metal is to be delivered through the nozzle 14. Under the above conditions, when a pushbutton or the like, by which an electric circuit (not shown) is controlled, is depressed by the operator, the winding 19' is energized, which results in the closing of valve 16. At the end of valve closing motion, the microswitch 19 is also closed. The closing of said microswitch results:

(1) In the closing of valve 4.
(2) In the opening of valve 22,
(3) In the opening of valve 15, and
(4) In the starting of a timer (not shown), thus allowing the air, that is present above the level of liquid in the container 9, to flow toward the furnace, and more precisely in the space above of molten metal level, while oil is transferred from the container 9 to upper container 21. The ensuing delivery of molten metal is stopped when the time, that is preset on timer, is expired. The expiring of such time results:

(1) In the opening of valve 16,
(2) In the closing of valve 15,
(3) In the closing of valve 22 and in the opening of valve 4.

By the above sequence of operations, the upper section of furnace 12 is put in communication with the atmosphere, while a certain amount of pressure air is fed above the liquid present in the container 9; such amount is larger than the previous one, due to the fact that a portion (proportional to time pre-set on the timer) of oil present in said container 9, was transferred, in the course of preceding cycle—i.e. the delivery cycle—through the duct 20 and the throttle section 24, to upper container 21. Said larger amount of pressure air, by suitably acting on the oil flowing through throttle section 24 during the next delivery cycle, will compensate for the increased volume of space resulting from the decrease in the level of molten metal bath, caused by the preceding delivery.

The circuit is thus brought back in its initial condition, and is ready to be re-started by the operator, when the pushbutton or similar control is depressed by him.

As it can be readily appreciated, a double-unequivocal relationship exists between the oil-level in the container 9, and the level of molten bath 13, which means that at each value of former level, shall correspond a well defined value of latter level, whereby the level gauge 27 can be graduated in such a manner as to give an accurate reading of molten bath level 13.

When the minimal value has been attained by the molten bath level—which might be that indicated by the dash line A—A—the level gauge 27 will indicate zero, thereby informing the operator that a refilling of furnace is needed. Moreover, same operator shall provide for having all the oil, which was in the meantime transferred to upper container 21, brought back to container 9. To perform such operation, it is sufficient to shift the handlever 7 in the position X. Thus, the duct 8 is connected (as in 30) with the atmosphere, through the four-way valve 6, while the pressure air is delivered by the source 1, through the duct 31, into the container 31 thus forcing the oil contained therein, through the non-return valve 25, back into the container 9, whereby the plant is made ready for the next working cycle, since the valve 22 can be opened when a given pressure is acting in the direction of container 9.

It is apparent from the above description that the furnace 12 together with the nozzle 14 form a delivery container means from which the liquid product 13 is delivered in response to the action of the gas under pressure on the surface of the liquid product 13. The container 9 together with the level gauge 27 form an indicating container means containing the indicating liquid 10 the level of which is indicative of the level of the liquid product 13 in the delivery container means 12, 14. The duct 11 forms a connecting conduit means communicating with the body of gas under pressure over the liquid 10 and with the space over the liquid product to provide action of the gas under pressure both on the liquid 10 and the liquid 13, and the connecting conduit means 11 carries the connecting valve means 15 for opening and closing the connecting conduit means. The valve 16 forms an atmospheric valve means connected to the connecting conduit means 11 between the valve means 15 and the delivery container means 12, 14 for placing the interior of the delivery container means 12, 14 into or out of communication with the outer atmosphere. The pipe 20 with the valve 22, the branch 23' and the throttle 24 carried thereby form a discharge control means communicating with the indicating liquid 10 to provide a controlled discharge thereof at a rate which will give from the level of the liquid 10 an accurate indication of the level of the liquid product 13. This pipe 20 of the discharge control means communicates downstream of the branch 23' with a collecting container means 21 in which the discharged indicating liquid 10 is collected. The space within the indicating container means 9 above the liquid therein communicates with a supply conduit means 8 through which the gas under pressure is supplied to the space above the indicating liquid 10, and the supply valve means 4 is carried by the supply conduit means 8 for opening and closing the latter. At the end of a series of cycles as described above the liquid 10 is returned to the indicating container means 9, 27, and for this purpose the valve 6 forms a recycling valve means communicating with the supply conduit means 8 for placing the space above the liquid within the indicating container means 9, 27 in communication with the outer atmosphere while delivering the gas under pressure to the collecting container means 21 so as to force the collected indicating liquid therein back out of the same to return through the discharge control means back into the indicating container means, and for this purpose the pipe 20 of the discharge control means has the bypass branch 23" which bypasses the throttle means 24 and the branch 23' while permitting the returning indicating liquid 10 to flow through the non-return valve 25 back to the indicating container means, this latter valve of course preventing the indicating liquid from flowing through the bypass branch from the indicating container means 9, 27 toward the collecting container means 21. The valve control means described above coacts with the several valve means 4, 15, 16, and 22 for closing the atmospheric valve means 16 and supply valve means 4 and opening the connecting valve means 15 and discharge valve means 22 during a delivery cycle when liquid product is delivered from the delivery container means 12, 14, and for opening the valve means 4 and 16 while closing the valve means 15 and 22 during supply of gas under pressure to the indicating container means 9, 27 above the liquid 10 therein in preparation for the next delivery cycle.

While the invention has been described in detail with respect to a certain embodiment form thereof, it will be understood by those skilled in the art, after understanding the invention, that various changes and modification may be made without departing from the spirit and scope of same invention, and is intended therefore, to cover all such changes and modifications in the appended claims.

What I claim is:

1. In a device for delivering a liquid product, delivery container means for delivering a liquid product therein out of said container means in response to the action of a gas under pressure on the liquid product in said container means, indicating container means for containing an indicating liquid with a body of gas under pressure thereover for providing from the level of the indicating liquid an indication of the level of the liquid product in said delivery container means, connecting conduit means operatively connected with both of said container means and communicating with spaces therein over the indicating liquid and liquid product, respectively, for transmitting the force of the body of gas under pressure which acts on the indicating liquid to the liquid product to deliver the latter out of said delivery container means, supply conduit means communicating with the space in said indicating container means over said indicating liquid therein for supplying gas under pressure to the latter space, and discharge control means operatively connected to said indicating container means and communicating with the indicating liquid therein for discharging the indicating liquid therefrom in response to the action of the body of gas under pressure at a controlled rate which provides from the level of the indicating liquid an accurate indication of the level of the liquid product in said delivery container means.

2. The combination of claim 1 and wherein a connecting valve means is operatively connected to said connecting conduit means for opening and closing the latter, an atmospheric valve means is operatively connected to said connecting conduit means between said connecting valve means and said delivery container means for placing the latter into or out of communication with the outer atmosphere, a supply valve means is operatively connected to said supply conduit means for opening and closing the latter, and a valve control means coacts with all of the latter valve means for simultaneously closing said supply valve means and atmospheric valve means and opening said connecting valve means during a delivery cycle when the force of the body of gas under pressure is transmitted from said indicating container means through said connecting conduit means to said delivery container means and for simultaneously opening said supply valve means and atmospheric valve means while closing said connecting valve means in preparation for the next delivery cycle.

3. The combination of claim 2 and wherein said discharge control means includes a pipe operatively connected to said indicating container means and communicating with the indicating liquid therein and a discharge valve means operatively connected to said pipe and co-acting with said valve control means to be opened simultaneously with the opening of said connecting valve means and closed simultaneously with the closing of said connecting valve means.

4. The combination of claim 3 and wherein said discharge control means includes an adjustable throttling means communicating with said pipe for throttling the flow of indicating liquid therethrough when said discharge valve means is open so as to control the rate of discharge of the indicating liquid from said indicating container means.

5. The combination of claim 4 and wherein said throttling means is situated along said pipe downstream of said discharge valve means.

6. The combination of claim 4 and where in a collecting container means communicates with said pipe of said discharge control means downstream of said discharge valve means and throttling means for collecting the indicating liquid discharged from said indicating container means.

7. The combination of claim 6 and wherein a bypass conduit communicates with said pipe and bypasses said throttling means for directing the indicating liquid back from said collecting container means through said bypass conduit along said pipe back to said indicating container means during recycling of the device.

8. The combination of claim 7 and wherein a non-return valve means is carried by said bypass conduit for preventing indicating liquid from flowing therethrough toward said collecting container means and permitting the indicating liquid to flow through said bypass conduit only from said collecting container means toward said indicating container means.

9. The combination of claim 8 and wherein a recycling means is operatively connected with said supply conduit means downstream of said supply valve means for placing said space within said indicating means over the indicating liquid in communication with the outer atmosphere and for directing the gas under pressure into said collecting container means to return the indicating liquid therefrom to said indicating container means in preparation for the next delivery cycle.

10. The combination of claim 9 and wherein said recycling means is manually operable.

References Cited

UNITED STATES PATENTS 2,599,560  6/1952  Ketterer _____ 73—290 X

FOREIGN PATENTS 718,824  3/1942  Germany.

ALAN COHAN, *Primary Examiner.*